May 21, 1957   E. MULLEN ET AL   2,792,927
LOAD CARRIERS FOR USE IN OVERHEAD TROLLEY CONVEYOR SYSTEMS
Original Filed May 17, 1947   3 Sheets-Sheet 2
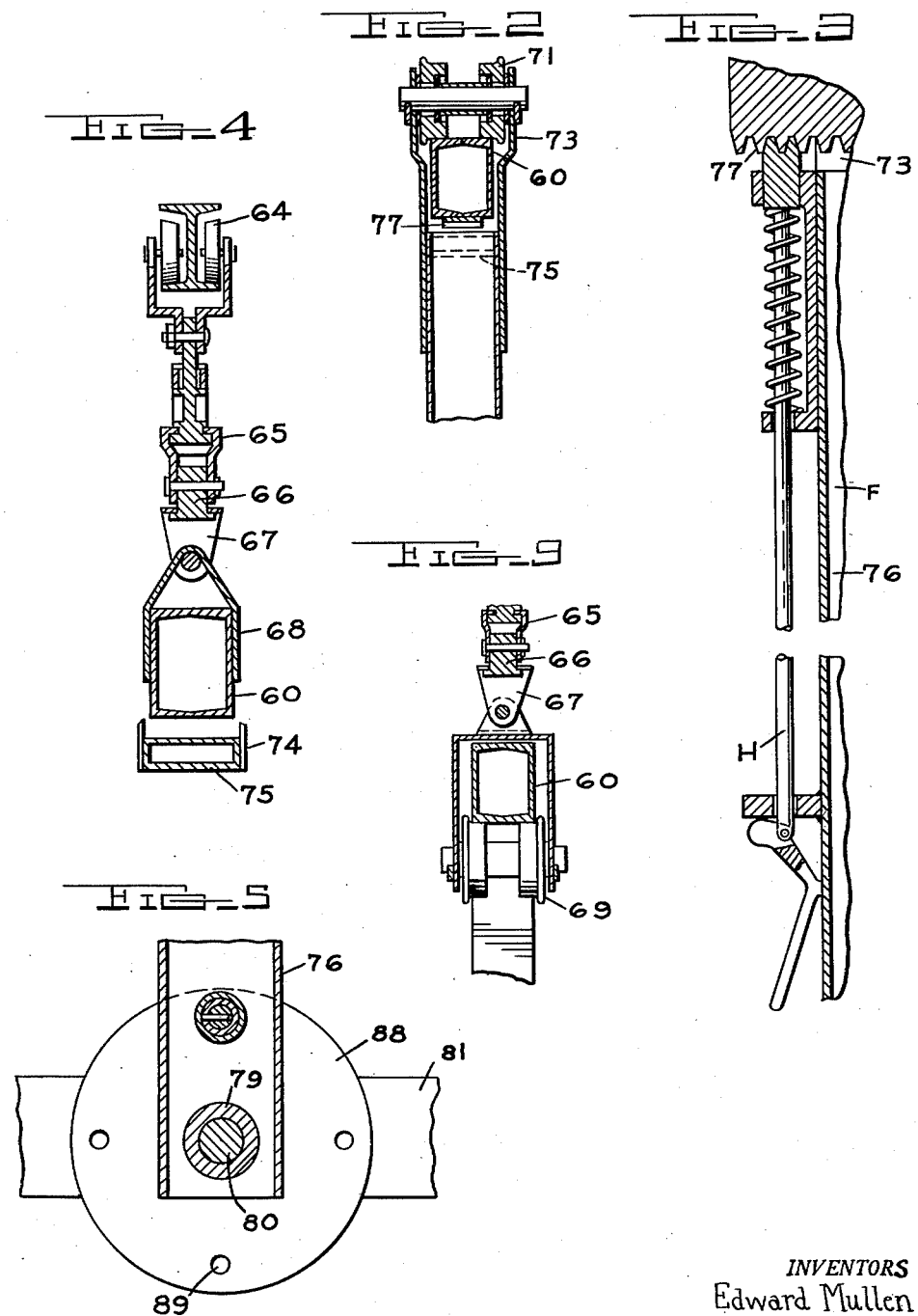
INVENTORS
Edward Mullen
Ross Harris
BY
Joseph Varley
ATTORNEY

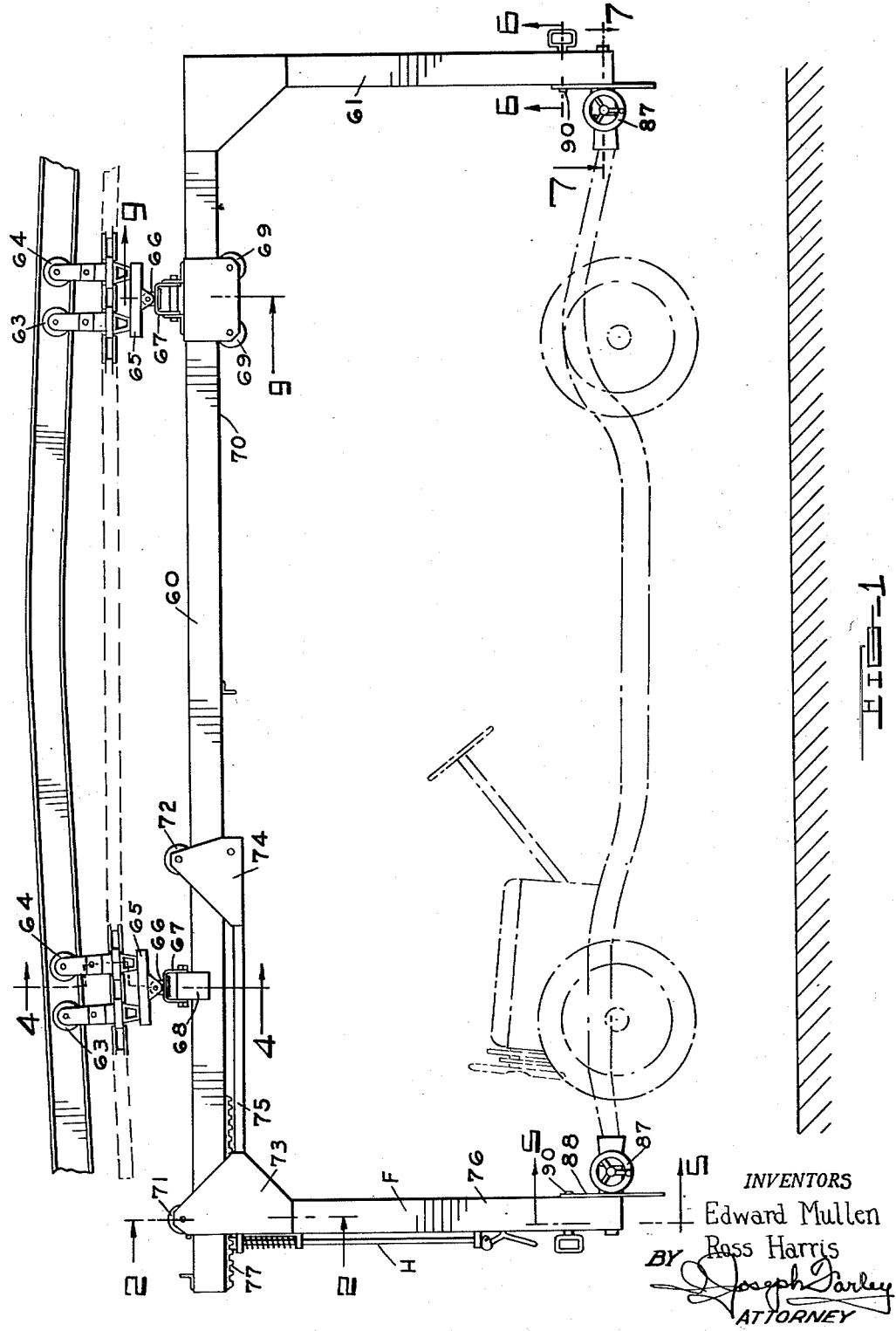

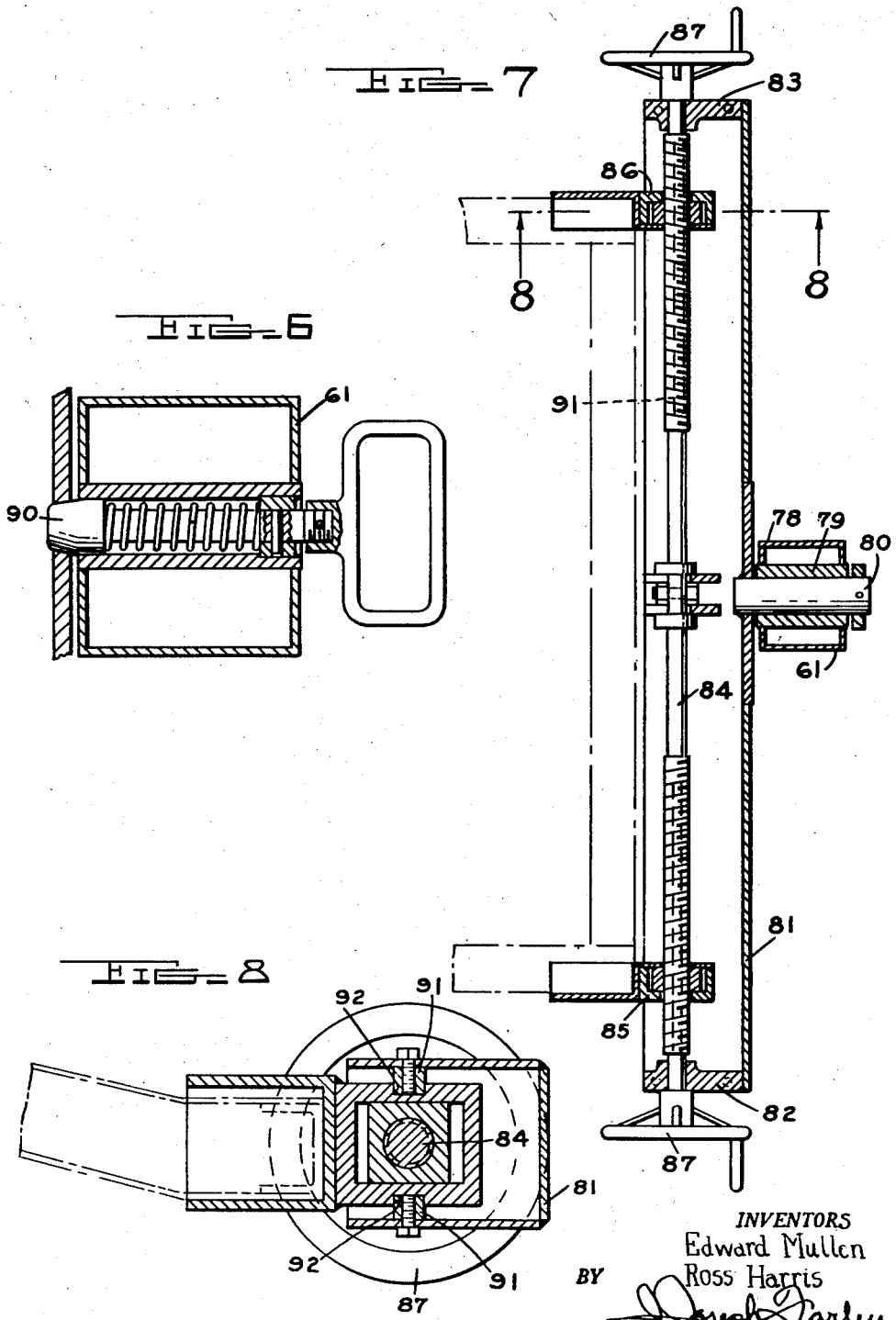

United States Patent Office 2,792,927
Patented May 21, 1957

2,792,927

LOAD CARRIERS FOR USE IN OVERHEAD TROLLEY CONVEYOR SYSTEMS

Edward Mullen, Detroit, Mich., and Ross Harris, Branson, Mo., assignors to Mechanical Handling Systems, Inc., Detroit, Mich., a corporation of Michigan Original application May 17, 1947, Serial No. 748,704, now Patent No. 2,664,993, dated January 5, 1954. Divided and this application July 8, 1953, Serial No. 366,782

7 Claims. (Cl. 198—177)

This invention relates to overhead trolley conveyors and more particularly to conveyor fixtures adapted to support a load at points longitudinally spaced along the conveyor track and to be supported by a plurality of trolleys propelled along the conveyor track by a chain drive. This application is a division of parent application Serial No. 748,704 filed on May 17, 1947, and now Patent No. 2,664,993 and is directed to one of the non-elected species originally disclosed therein.

In providing carrying means of this type a number of problems are encountered in making provision for horizontal and vertical curves in the conveyor track especially where each of the trolleys which contribute to the support of a single load is propelled by a common drive chain.

The nature of such problems may be seen by referring to a typical case wherein four longitudinally spaced trolleys are used to support a single rigid load, two adjacent trolleys being adapted to support each end of the load with a plurality of additional trolleys interposed between the two pairs of load supporting trolleys, and all of the trolleys being propelled by a common drive chain. If the relative motion of such trolleys be considered independently of any carrying means or load attached thereto, the various types of movement which must be provided for in such carrying means becomes apparent.

Taking first the case of a horizontal curve in the track, as the first of the load supporting trolleys enters such curve, it is necessary that such trolley pivot about a vertical axis relative to the following trolleys. As the first trolley rounds a curve the driven chain suspended between the first two trolleys will form a chord cutting across the arc of the curve. Such chord line will be defined by the rear pivotal point in the chain link which is attached to the first trolley bracket and the forward pivotal point in the chain link attached to the second trolley bracket. Since such pivotal points in the respective chain links are usually longitudinally spaced from the vertical axis of the trolley brackets in question, a second chord line lying outside of the line of the chain intermediate the first two trolley brackets will be defined by the vertical axes of the trolley brackets. The length of such second chord line will be somewhat shorter than the distance between the same trolleys' axes on the straight section of track before entering the curve due to the fact that as soon as the first trolley enters the curve, the chain between the first two trolleys assumes a position other than its most extended position. Therefore, if a carrying fixture supported by the first two trolleys were such as to define a fixed distance between the trolleys, the first trolley would not be free to follow the path of the curve but would tend to be held in a straight position by the tension developed in the driven chain.

Thus, it will be seen that any rigid carrying fixture suspended from the first two trolleys should include provision for permitting each of the trolleys to move closer to each other in rounding a horizontal curve as well as to permit each trolley to pivot about its vertical axis independent of the other trolleys and independent of the position of the fixture between the first two trolleys.

As the trolleys continue around the curve, it will be seen that a series of short chord lines will be formed by the chain extending between adjacent trolley brackets and that a major chord line will be defined by the forward and rear end of a load suspended from a point between the first two load carrying trolleys and at a second point between the last two load carrying trolleys.

Since the drive chain attached to each of the trolley brackets follows more closely the curved path of the conveyor track than the major chord line described above, it is apparent that the suspension connections at one end must be free to move closer to the suspension connections at the other end while the load is rounding a curve in the track by an amount equal to the difference in length between that of the major chord line mentioned and the length of the chain between the points establishing such chord line. It is also apparent that during the rounding of such curve, the major chord line will extend in a horizontal direction different both from the line joining the first two load supporting trolley brackets and that joining the last two load supporting trolley brackets. Thus, if any rigid form of member is used to divide the load between the first two or the last two load supporting brackets, provision must be made for the pivotal movement of such rigid member about a vertical axis relative to the fixture members which more directly support the load.

In the case of vertical curves, similar problems are encountered with respect to changes in the relative distances between the forward and rear end supporting points as compared to the length of chain between such points. In addition, in order that the individual bracket members may be free to assume a position normal to the surface of the track throughout such vertical curve, it becomes necessary to provide in the attachment to the load carrying means a connection which permits pivotal movement of the individual brackets about a transverse axis relative to the other brackets as well as to the load carrying means.

Furthermore, unless the load is to be permitted to swing freely in a longitudinal path relative to the load supporting brackets, a rigid form of carrying means must be provided which will maintain one end of the load in a substantially fixed position relative to a load supporting bracket member associated with such end. To permit the swinging movement mentioned may be objectionable for a number of reasons including possible danger and damage incident thereto, inconvenience where it is desired to perform certain operations on the load as it is being carried, as well as additional space which would be required between adjacent loads to prevent one load from swinging into another as it started up or down a vertical curve.

On the other hand, it will be recognized that the provision of a rigid structure for preventing such a swinging motion augments the difficulty in providing necessary freedom for the movements discussed above.

The embodiment disclosed herein incorporates the necessary freedom of movement discussed above while providing a fixed longitudinal position for the load relative to at least one of the supporting trolleys.

In general, it is the object of the present invention to provide a carrying fixture adapted to support an elongated rigid load, such as an automobile body or chassis, from two longitudinally spaced points under an overhead conveyor track, and to be supported by a plurality of trolleys each of which is propelled along the conveyor track by a common drive chain.

More specifically, it is an object of the present invention to provide carrying means of this general type which will permit (a) the pivotal movement of each load supporting trolley bracket about a vertical axis independent of the other trolley brackets and of the load and load carrying fixture; and (b) the pivotal movement of each load supporting trolley bracket in a vertical plane passing through the conveyor track relative to the other trolley brackets, load and load carrying fixture.

Another object is to provide carrying means incorporating provision for the relative movements outlined above which is simple, economical of construction and dependable.

These and other objects will appear more clearly from a detailed description of a particular embodiment of our invention and by reference to the drawings forming a part hereof and wherein:

Fig. 1 is a side elevation showing the general arrangement of a carrying fixture adapted to convey an automobile chassis along an overhead conveyor track.

Fig. 2 is a sectional view taken along the line 2—2 of Fig. 1.

Fig. 3 is an enlarged framentary view of the locking and release mechanism shown at the left-hand end of Fig. 1.

Fig. 4 is an enlarged sectional view taken along the line 4—4 of Fig. 1.

Fig. 5 is an enlarged sectional view taken along the line 5—5 of Fig. 1.

Fig. 6 is an enlarged detail view taken along the line 6—6 of Fig. 1.

Fig. 7 is an enlarged view taken along the line 7—7 of Fig. 1 showing the adjustable mechanism for connecting the load onto the carrying framework.

Fig. 8 is an enlarged detail view taken along the line 8—8 of Fig. 7.

Fig. 9 is an enlarged detail view taken along the line 9—9 of Fig. 1.

Referring to Fig. 1, an embodiment including a load fixture is shown incorporating features of freedom of movement with respect to the trolley brackets which support and propel a load. This fixture comprises generally a rigid framework having a longitudinal member 60 and a depending member 61, as well as a longitudinally movable depending member F. As shown in Fig. 2, the longitudinal member 60 is fabricated from a pair of channel members having their flanges placed end to end and welded together thereby forming a boxlike section. The forward end of the member 60 is suspended from the conveyor track 62 by a pair of trolley brackets 63, 64, bracket member 65, swivel 66, clevis 67 and hanger 68. The detail of this suspension is shown in Fig. 4 where it may be seen that the individual trolleys 63, 64 are free to pivot about a vertical axis relative to each other, that the bracket member 65 is free to swivel about a vertical axis and also free to pivot about a transverse axis, and that the clevis 67 is free to pivot about a longitudinal axis. The hanger 68 which is welded to the longitudinally extending fixture member 60 fixes the longitudinally position of the carrying fixture relative to the forward trolleys while the rear trolleys 63, 64 which are similar in construction in all other respects to the forward assembly are longitudinally movable relative to the fixture member 60. Such relative longitudinal movement is made possible by the provision of rollers 69 which supportingly contact the lower surface 70 of the fixture member 60, the detail of which construction is shown in Fig. 9.

The depending movable end member F of the carrying fixture is suspended from the forward end of the longitudinal member 60 by a pair of rollers 71, 72, each journaled in a pair of gusset plates 73, 74 which are in turn rigidly connected to the longitudinal member 75 and vertical member 76. A rack 77 is provided along the lower forward end of the longitudinal member 60 which is engaged by a retractable spring loaded stop assembly H, the details of which are shown in Fig. 3. Such mechanism serves to lock the forward assembly F in a fixed position after the load has been engaged.

The depending forward and rear end members 61 and 76 each lie in the same plane as the longitudinal member 60 and such members are each provided at their lower ends with similar load engaging assembiles. As shown in Fig. 7, these load engaging assemblies are pivotally journaled in the lower end 78 of each of the depending members 76, 61 by means of a bearing 79 provided in such lower end and a shaft 80 journaled in such bearing.

The shaft 80 is rigidly connected to a transversely extending cross member 81 which is provided with end plates 82, 83 adapted to serve as journals for an adjustment screw 84 extending therebetween. The respective ends of the adjustment screw 84 are provided with right and left-hand screw threads which are engaged by internally threaded clamping members 85, 86 and hand wheels 87 at either end of the adjustment screw 84 are provided to permit both of the clamping members 85, 86 to be moved simultaneously into or out of engagement with the ends of the load. As best shown in Figs. 5 and 6, the circular disk 88 incorporated in the cross member 81 is provided with a plurality of holes 89 which may be aligned with a retractable locking pin 90 mounted above the journal 79 in the lower end of each of the depending members 76 and 61. Thus, when it is desired to perform various assembly or other operations on the load most conveniently accomplished by rotating the load to different positions about its longitudinal axis, such movement may be effected upon retracting the locking pin 90.

As shown most clearly in Fig. 8, the cross members 81 are U-shaped in form and are provided with transversely extending keys 91 which engage keyway slots 92 in the clamping members 85, 86, thereby preventing such members from rotating out of the load engaging position.

While a satisfactory embodiment incorporating the essential features of this invention has been described in detail, it will be recognized that numerous changes in the detailed construction are possible without departing from the scope of the invention as set forth in the appended claims.

We claim:

1. In an overhead conveyor system of the type wherein a plurality of trolley assemblies are propelled along a conveyor track by a single drive chain, carrying means adapted to support a rigid load at points spaced longitudinally of the conveyor track and to be supported by a plurality of said trolley assemblies, said carrying means being characterized by a member adapted to rigidly fix the longitudinal position of said load relative to one of said trolley assemblies through engagement with one end of said load, and a second member for engaging the other end of said load, said second member being movable to and from its load engaging position, the other of said load supporting trolley assemblies being free to shift in longitudinal position relative to said one trolley assembly, each of said trolley assemblies being free to pivot about a substantially vertical axis, about a second axis substantially parallel to said conveyor track and about a third axis substantially perpendicular to said other two axes independently of the other of said load supporting trolley assemblies and of said load.

2. An overhead conveyor system comprising an overhead conveyor track, longitudinally spaced, chain driven load supporting trolleys adapted to travel along said track, a carrier for rigid longitudinally extending loads suspended from at least two of said trolleys, said carrier having a rigid member extending longitudinally between said supporting trolleys, connecting means fixing the longitudinal position of said member relative to one of said trolleys, connecting means providing free relative longitudinal movement between said member and another of said trolleys, each of said connecting means including a vertical axis pivot permitting swivel movement of its trolley relative to said member, a depending member rigidly connected to one end of said first member and adapted to engage one end of a rigid load, a second depending member adapted to engage the other end of a rigid load, and longitudinally adjustable connecting means between said latter member and said first member.

3. Rigid load conveying means as set forth in claim 2 wherein said second depending member has a rigid longitudinal extension slidably supported at longitudinally spaced points on said first member, and means for releasably locking said second depending member in an adjusted longitudinal position relative to said first member.

4. Rigid load conveying means as set forth in claim 2 wherein load engaging members are provided at the lower ends of each of said depending members and wherein pivotal connections on a longitudinal axis are provided between said load engaging and depending members including adjustable means for locking said respective members against relative pivotal rotation.

5. Rigid load conveying means as set forth in claim 2 wherein a transversely extending load engaging member is provided at the lower end of at least one of said depending members including adjustable means for engaging transversely spaced points at the end of a rigid load.

6. Rigid load conveying means as set forth in claim 2 wherein a transversely extending load engaging member is provided at the lower end of each of said depending members, wherein a pivotal connection on a longitudinal axis is provided between each of said load engaging and depending members including adjustable means for locking said respective members against pivotal rotation, and wherein adjustable means are provided on said transversely extending members for engaging transversely spaced points at either end of a rigid load.

7. An overhead conveyor system comprising an overhead conveyor track, longitudinally spaced, chain driven load supporting trolleys adapted to travel along said track, a carrier for rigid longitudinally extending loads suspended from at least two of said trolleys, said carrier having a rigid member extending longitudinally between said supporting trolleys, connecting means fixing the longitudinal position of said member relative to one of said trolleys, connecting means including antifriction rollers between said member and another of said trolleys providing for free relative longitudinal movement therebetween, each of said connecting means including a vertical axis pivot permitting swivel movement of each trolley relative to said member, a depending member rigidly connected to one end of said first member adapted to removably engage one end of a rigid load, and a second depending member connected to the other end of said first member adapted to removably engage the other end of a rigid load.

References Cited in the file of this patent
UNITED STATES PATENTS

| | | |
|---|---|---|
| 410,108 | Kennedy et al. | Aug. 27, 1889 |
| 1,417,528 | Irish et al. | May 30, 1922 |
| 1,769,134 | Haff | July 1, 1930 |
| 2,103,901 | Gordon | Dec. 28, 1937 |
| 2,536,239 | Tyndall | Jan. 2, 1951 |